(12) United States Patent
Takamatsu et al.

(10) Patent No.: US 6,461,407 B2
(45) Date of Patent: Oct. 8, 2002

(54) METHOD AND APPARATUS FOR SUPPLYING LIQUID RAW MATERIAL

(75) Inventors: Yukichi Takamatsu; Takeo Yoneyama; Yoshiyasu Ishihama; Akira Asano, all of Kanagawa-ken (JP)

(73) Assignee: Japan Pionics Co., Ltd., Tokyo (JP)

( * ) Notice: Subject to any disclaimer, the term of this patent is extended or adjusted under 35 U.S.C. 154(b) by 0 days.

(21) Appl. No.: 09/725,566

(22) Filed: Nov. 30, 2000

(65) Prior Publication Data

US 2001/0002573 A1 Jun. 7, 2001

(30) Foreign Application Priority Data

Dec. 7, 1999 (JP) .............................. 11-348156

(51) Int. Cl.$^7$ .............................................. B01D 19/00
(52) U.S. Cl. ...................... 95/46; 95/53; 95/55; 96/6
(58) Field of Search ................... 95/46, 53, 55, 95/241, 263, 265; 96/6, 155, 202

(56) References Cited

U.S. PATENT DOCUMENTS 4,917,776 A  *  4/1990  Taylor ........................ 204/409
5,425,803 A  *  6/1995  van Schravendijk et al. ... 95/46

* cited by examiner

Primary Examiner—Robert A. Hopkins
(74) Attorney, Agent, or Firm—Oblon, Spivak, McClelland, Maier & Neustadt, P.C.

(57) ABSTRACT

Disclosed are a method for supplying a liquid raw material wherein the liquid raw material is deaerated and supplied from a liquid raw material container to a liquid flow control section, the method comprising passing the liquid raw material, supplied from a liquid raw material container by the pressure of a first inert gas, inside of a gas permeable synthetic resin tube, passing a second inert gas having a lower permeability into the synthetic resin tube than the first inert gas along the external surface of the synthetic resin tube whereby the first inert gas dissolved in the liquid raw material is allowed to penetrate into the outside of the synthetic resin tube and then supplying the liquid raw material to the liquid flow control section and an apparatus for supplying a liquid raw material which apparatus is used in the method. The invention ensures that inert gas dissolved in a liquid raw material can be removed easily and efficiently in a semiconductor manufacturing process using a liquid raw material.

13 Claims, 4 Drawing Sheets

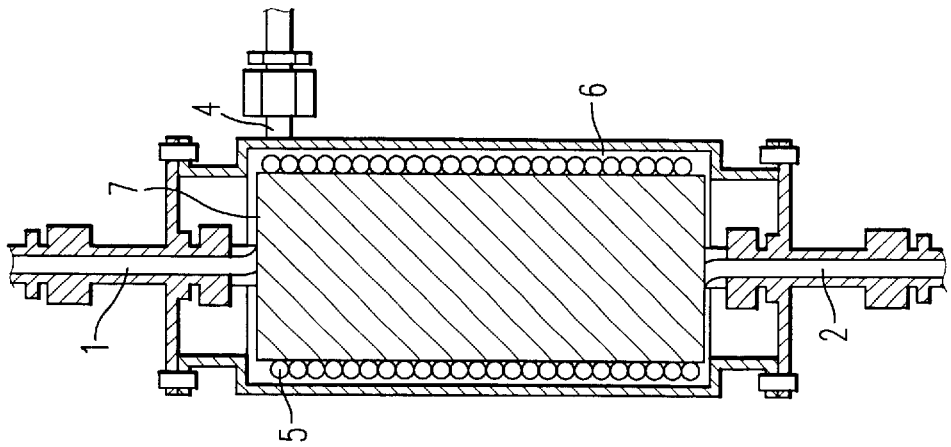
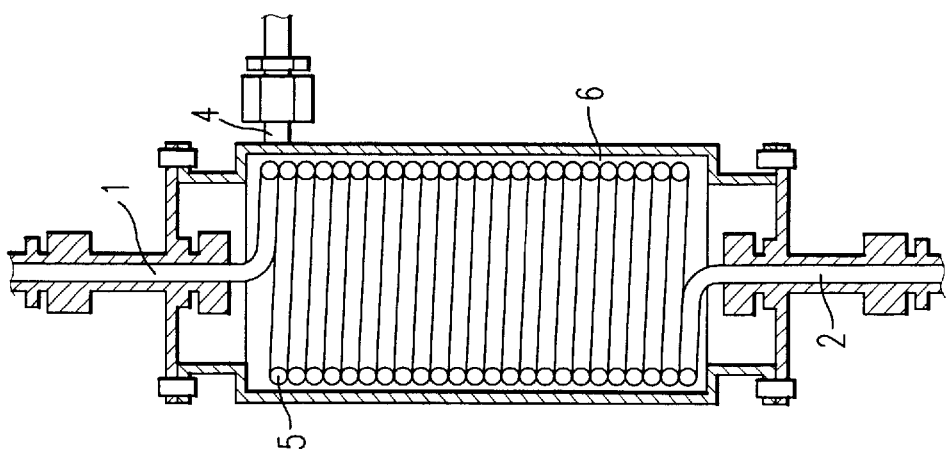

METHOD AND APPARATUS FOR SUPPLYING LIQUID RAW MATERIAL

BACKGROUND OF THE INVENTION

(1) Field of the Invention

The present invention relates to a method and an apparatus for supplying a liquid raw material, and, particularly, to a method and an apparatus for supplying a liquid raw material from a liquid raw material container to a liquid flow control section while deaerating the raw material in semiconductor manufacturing processes and the like.

(2) Description of the Prior Art

Along with the progress of semiconductor industries in recent years, high performance and highly integrated semiconductor devices have been developed. As raw materials for metal films and insulated films, various liquid organic metal compounds have come to be used in place of conventionally used hydride gases and halide gases.

To state, for example, metal films of semiconductor devices, dimethylaluminum hydride ($Al(CH_3)_2H$) is used as a CVD raw material for an aluminum film, hexafluoroacetylacetone copper vinyltrimethylsilane (($CF_3CO)_2CHCu.CH_2CHSi(CH_3)_3$) as a CVD raw material for a copper film and bis(ethylcyclopentadienyl)ruthenium ($Ru(C_5H_4C_2H_5)_2$) as a CVD raw material for a ruthenium film. Also, to state insulated films of semiconductor devices, $SiO_2$ is known as a gate insulated film, $Si_3N_4$ as a capacitor insulated film and PSG (Phosphorous/ silicon/ glass) and BPSG (boron/phosphorous/silicon/glass) as a layer insulated film. Moreover, tetraethoxysilicon ($Si(OC_2H_5)_4$) is used as a CVD raw material for $SiO_2$ film and trimethoxyboron ($B(OCH_3)_3$), trimethoxyphosphine oxide ($PO(OCH_3)_3$) and the like are used as CVD raw materials for a PSG film and a BPSG film.

Meanwhile, various apparatuses and methods have been developed for supplying these liquid raw materials to manufacturing apparatuses of semiconductors at a desired concentration and at a desired flow rate by vaporization. For example, liquid raw material vaporizing equipment provided with a liquid flow control section for controlling the flow rate of a liquid raw material and a vaporizer for atomizing the liquid raw material, controlled by the flow control section, by ultrasonic vibration, and vaporizing the atomized material by heating is known (Japanese Patent Application Laid-Open No.5-132779). Also, a method for supplying a liquid raw material is known in which the liquid raw material whose flow rate is controlled by a liquid flow control section is mixed with a pressurized carrier gas and thereafter the flow rate of the gas is controlled to become constant (Japanese Patent Application Laid-Open No.9-111456). Further, a method for supplying a liquid raw material is known, having an apparatus which is connected to a mass flow controller and a low pressure source and removes gas dissolved in the liquid raw material (Japanese Patent Application No.6-220640).

In the liquid flow control section used in the aforementioned supply method or supply apparatus, a two- or multiple-series of corrosion resistant bellows pump which can supply a liquid raw material without pulsating current or a mass flow controller in place of a pump is used because the liquid raw material must be supplied to the vaporizer quantitatively with extremely high accuracy. Such a bellows pump and liquid mass flow controller can supply a liquid raw material to the vaporizer quantitatively with high accuracy when the liquid raw material is homogeneous. However, the liquid raw material cannot be supplied at a constant flow rate when inert gas and the like exist as fine air bubbles in the liquid raw material.

Namely, in a general supply system for liquid raw materials, a liquid raw material container is filled with inert gas such as helium, nitrogen, argon or the like and the liquid raw material is supplied to the liquid flow control section by the pressure of the inert gas in the production of a semiconductor.

In the process of producing a semiconductor, therefore, a relatively large amount of inert gas is dissolved in the liquid raw material because of its a pressurized condition in the liquid raw material container. On the other hand, the CVD apparatus is operated under reduced pressure. Hence the liquid flow control section disposed between the container and the CVD apparatus is operated under atmospheric pressure or lower pressure. The solubility of the inert gas in the liquid raw material is lowered and the dissolved inert gas frequently generates fine air bubbles by the time when the liquid raw material reaches the outlet side of the liquid flow control section. If fine air bubbles are present in the liquid raw material, this offers such a disadvantage that the liquid raw material can not be measured in a bellows pump or a mass flow controller, and the liquid raw material cannot be quantitatively supplied to semiconductor-manufacturing equipment in a vapor state with high accuracy. Also, when fine air bubbles are generated in the liquid raw material after the liquid raw material passes through the liquid flow control section, this offers such a disadvantage that the air bubbles adversely affect the uniformity of film qualities.

SUMMARY OF THE INVENTION

Accordingly, an object of the present invention is to solve the aforementioned problem and to provide a method and apparatus for supplying a liquid raw material, the method and apparatus making it possible to remove inert gas dissolved in the liquid raw material as aforementioned easily and efficiently before the flow rate of the liquid raw material is controlled in a liquid flow control section such as a bellows pump or a mass flow controller in a semiconductor-manufacturing process using the liquid raw material.

The inventors of the present invention have conducted earnest studies to solve the above problem and as a result, found that degassing can be attained by passing a liquid raw material, in which a first inert gas is dissolved, in the inside of a gas permeable synthetic resin tube and by passing a second inert gas having a lower permeability into the synthetic resin tube than the first inert gas to allow the first inert gas to penetrate into the outside of the synthetic resin tube while the penetration of the second inert gas into the inside of the synthetic resin tube is restrained. Thus the present invention was completed.

Specifically, the present invention resides in a method for supplying a liquid raw material wherein the liquid raw material is deaerated and supplied from a liquid raw material container to a liquid flow control section, the method comprising passing the liquid raw material, supplied from a liquid raw material container by the pressure of a first inert gas, inside of a gas permeable synthetic resin tube, passing a second inert gas having a lower permeability into the synthetic resin tube than the first inert gas along the external surface of the synthetic resin tube whereby the first inert gas dissolved in the liquid raw material is allowed to penetrate into the outside of the synthetic resin tube and then supplying the liquid raw material to the liquid flow control section.

The present invention also resides in an apparatus for supplying a liquid raw material. The apparatus is equipped with a deaerating section of liquid raw material and a liquid flow control section, the deaerating section comprising a gas permeable synthetic resin tube, an introduction port and a discharge port for introducing and discharging the liquid raw material, the both being connected to each other by the synthetic resin tube, a passage for passing the inert gas along the external surface of the synthetic resin tube and an introduction port and a discharge port for introducing and discharging the inert gas.

BRIEF DESCRIPTION OF THE DRAWINGS

In the drawings:

FIG. 2(A) and FIG. 2(B) are longitudinal sectional views respectively showing an example of a deaerating section used in the present invention;

DETAILED DESCRIPTION OF THE INVENTION

Figure 1:
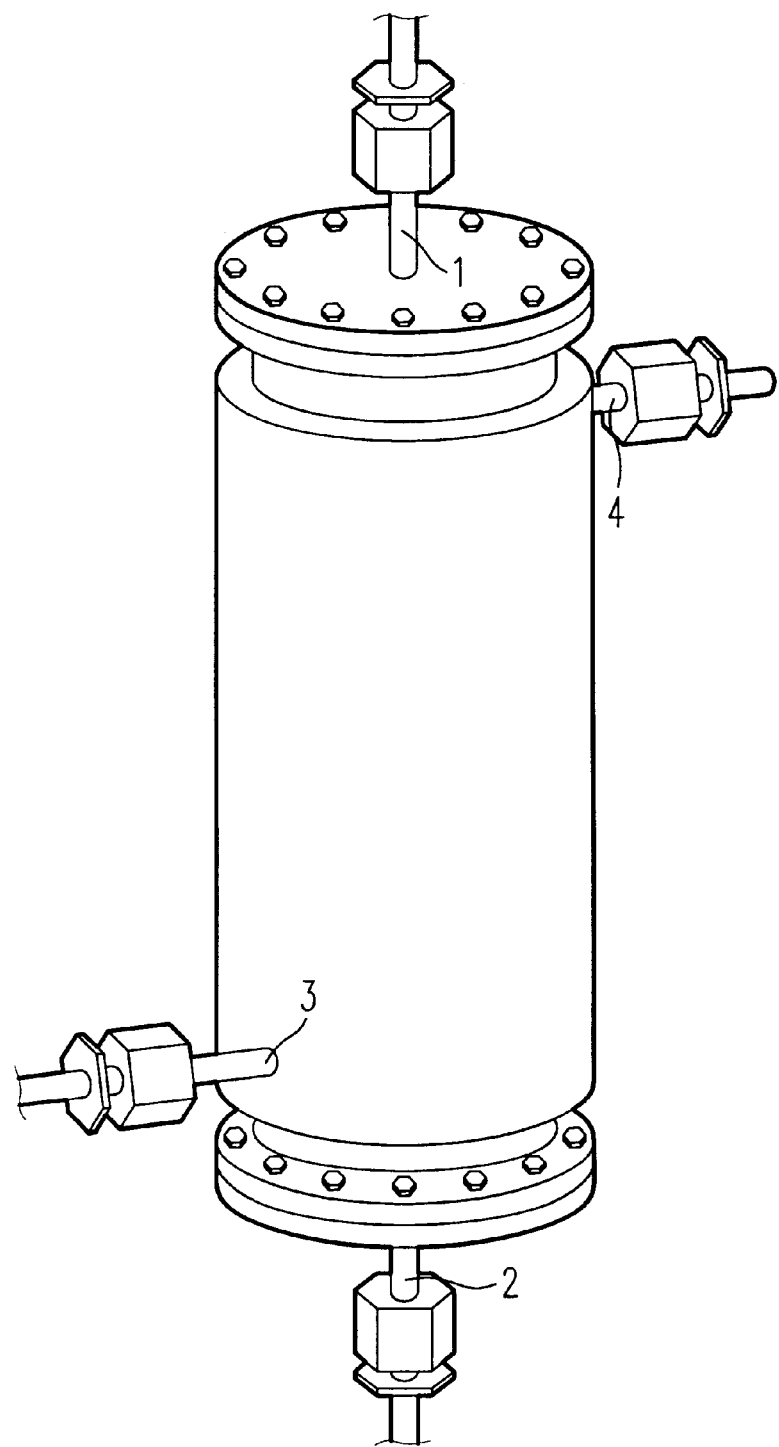
FIG. 1 is a perspective view showing an example of a deaerating section used in the present invention.

The present invention is applied to a method and a apparatus for supplying a liquid raw material, used in semiconductor manufacturing processes or the like, from a liquid raw material container to a liquid flow control section.

No particular limitation is imposed on the raw material used in the supply method and apparatus according to the present invention as far as it can be kept in a liquid state including the cases where it is a liquid at ambient temperature and it is dissolved in a solvent even if it is a solid. These raw materials may be optionally selected according to use and used. Examples of the raw material may include alkoxides, which are liquids at ambient temperature, such as tetra-isopropoxytitanium ($Ti(OCH(CH_3)_2)_4$), tetra-n-propoxytitanium ($Ti(OC_3H_7)_4$), tetra-tert-butoxyzirconium ($Zr(OC(CH_3)3)_4$), tetra-n-butoxyzirconium ($Zr(OC_4H_9)_4$), tetramethoxyvanadium ($V(OCH_3)_4$), trimethoxyvanadyl oxide ($VO(OCH_3)_3$), pentaethoxyniobium ($Nb(OC_2H_5)_5$), pentaethoxytantalum ($Ta(OC_2H_5)_5$), trimethoxyboron ($B(OCH_3)_3$), tri-isopropoxyaluminum ($Al(OCH(CH_3)_2)_3$), tetraethoxysilicon ($Si(OCH_2H_5)_4$), tetraethoxygermanium ($Ge(OC_2H_5)_4$), tetramethoxytin ($Sn(OCH_3)_4$), trimethoxyphosphorous ($P(OCH_3)_3$), trimethoxyphosphine oxide ($PO(OCH_3)_3$), triethoxyarsenic ($As(OCH_2H_5)_3$) and triethoxyantimony ($Sb(OCH_2H_5)_3$).

In addition to the above compounds, raw materials, which are liquids at ambient temperature, such as trimethylaluminum ($Al(CH_3)_3$), dimethylaluminum hydride ($Al(CH_3)_2H$), tri-isobutylaluminum ($Al(iSO-C_4H_9)_3$), hexafluoroacetylacetone copper vinyltrimethylsilane (($CF_3CO)_2$CHCu.$CH_2$CHSi($CH_3)_3$), hexafluoroacetylacetone copper allyltrimethylsilane (($CF_3CO)_2$CHCu.$CH_2$CHCH$_2$Si($CH_3)_3$), bis(iso-propylcyclopentadienyl)tungsten dihalide (($iso$-$C_3H_7C_5H_5)_2WH_2$), tetradimethylaminozirconium ($Zr(N(CH_3)_2)_4$), pentadiethylaminotantalum ($Ta(N(C_2H_5)_2)_5$), tetradimethylaminotitanium ($Ti(N(CH_3)_2)_4$) and tetradiethylaminotitanium ($Ti(N(C_2H_5)_2)_4$) may also be used.

Further, examples of the raw material may include hexacarbonyl molybdenum ($Mo(CO)_6$), dimethylpentoxygold ($Au(CH_3)_2(OC_5H_7)$), bis(2,2,6,6,-tetramethyl-3,5heptane dionite)barium ($Ba((C(CH_3)_3)_2C_3HO_2)_2$), bis(2,2,6,6,-tetramethyl-3,5heptane dionite)strontium ($Sr((C(CH_3)_3)_2C_3HO_2)_2$), tetra(2,2,6,6,-tetramethyl-3,5heptane dionite) titanium ($Ti((C(CH_3)_3)_2C_3HO_2)_4$), tetra(2,2,6,6,-tetramethyl-3,5heptane dionite)zirconium ($Zr((C(CH_3)_3)_2C_3HO_2)_4$), bis(2,2,6,6,-tetramethyl-3,5heptane dionite)lead ($Pb((C(CH_3)_3)_2C_3HO_2)_2$) and pentadimethylaminotantalum ($Ta(N(CH_3)_2)_5$), which are solid raw materials at ambient temperature. These raw materials are used in a concentration of about 0.1 to 0.5 mol/L by dissolving them in an organic solvent such as hexane, heptane, butyl acetate, isopropyl alcohol or tetrahydrofuran.

The method and apparatus for supplying a liquid raw material according to the present invention will be hereinafter explained in detail with reference to the attached FIG. 1 to FIG. 3, which, however, are not intended to be limiting of the present invention.

The apparatus for supplying a liquid raw material according to the present invention is provided with a deaerating section for deaerating the liquid raw material and a liquid flow control section. In the apparatus, the liquid raw material is supplied from a liquid raw material container to the liquid flow control section while inert gas dissolved in such a liquid raw material as aforementioned is removed whereby the liquid raw material can be controlled in the liquid flow control section with high accuracy. The apparatus for supplying a liquid raw material according to the present invention may be applied to, for example, a vaporizing and supplying apparatus as shown in FIG. 3.

The deaerating section in the apparatus for supplying a liquid raw material according to the present invention, as shown in FIG. 1 and FIG. 2, comprises a gas permeable synthetic resin tube 5, an introduction port 1 and a discharge port 2 for introducing and discharging the liquid raw material respectively, the both being connected to each other by the synthetic resin tube, a passage 6 for passing inert gas along the external surface of the synthetic resin tube and an introduction port 3 and a discharge port 4 for introducing and discharging the inert gas respectively. In such a deaerating section, the liquid raw material in which a first inert gas is dissolved is allowed to flow in the internal side of the gas permeable synthetic resin tube and a second inert gas having a lower permeability into the synthetic resin tube than the first inert gas is allowed to flow along the external surface of the synthetic resin tube whereby the first inert gas dissolved in the liquid raw material is allowed to penetrate into the outside of the synthetic resin tube and removed.

As examples of the simplest structure of the deaerating section, a duplex tube consisting of a gas permeable synthetic resin tube as the internal tube and a gas non-permeable tube as the external tube may be given. It is necessary to make the synthetic resin tube narrower and longer in order to remove inert gas, dissolved in the liquid raw material, in an efficient manner. Because the deaerating section become therefore long-sized, it is preferable to adopt a deaerating section having a structure in which a gas permeable synthetic resin tube is wound coil-wise and enclosed. As such a deaerating section, a deaerating section having a structure in which a gas permeable synthetic resin tube is wound coil-wise and enclosed inside of a cylindrical or polygonal cylindrical container as shown by the perspective view of FIG. 1 and by the longitudinal sectional view of FIG. 2(A) may be exemplified.

Also, as shown by the longitudinal sectional view of FIG. 2(B), a deaerating section having a structure in which a gas permeable synthetic resin tube is wound coil-wise around the side surface of a column 7 or a polygonal column and enclosed inside of a cylindrical or polygonal cylindrical container controls the second inert gas such that it flows in a fixed direction and increases the flow rate of the second inert gas to promote the penetration of the first inert gas, dissolved in the liquid raw material, into the outside of the synthetic resin tube. Further, if the aforementioned cylinder is made of a bar heater, the penetration of the first inert gas can be further promoted by heating the liquid raw material at 40 to 80° C.

It is to be noted that in such a deaerating section as shown by the perspective view of FIG. 1 and the longitudinal sectional view of FIG. 2, it is preferable to design the second inert gas introducing and discharging ports for the second inert gas to make smooth circular flow in the deaerating section to form an angle of 0 to 45 degrees with the direction tangential to the horizontal plane of the inside wall of the container.

Any material may be used for the synthetic resin tube in the present invention as far as it permeates gas but does not permeate the liquid raw material and as far as it is resistant to chemicals. It is preferable to use a fluorocarbonresin in view of excellent chemical resistance though, for instance, polyethylene, polypropylene or the like may be used. Examples of the fluorocarbon resin may include a polytetrafluoroethylene (PTFE), polytrifluoroethylene (PTrFE), polyvinylidene fluoride (PVdF) and tetrafluoroethyleneperfluoroalkylvinyl ether copolymer (PFA). Although the inside diameter and length of the synthetic resin tube vary depending upon the flow rate of the liquid raw material, the inside diameter and the length are generally 0.1 to 3 mm and 0.5 to 20 m respectively and preferably 0.3 to 0.8 mm and 1 to 5 m respectively. The thickness of the synthetic resin tube is generally 0.05 to 2 mm and preferably 0.1 to 1 mm though it differs depending upon the type of material.

The liquid flow control section in the present invention is used to supply the liquid raw material quantitatively to the vaporizer with high accuracy and is constituted of a flow variable pump, a control valve and the like or a pump, a flow control device and the like. As the pump, a two- or multiple-series of corrosion resistant bellows pump is generally used to supply the liquid raw material without pulsating current. The subsidiary side of the pump may be provided with a check valve to enable exact flow control even if a CVD apparatus is operated under reduced pressure. Also, a liquid mass flow controller may be used in place of a pump because the liquid raw material can be supplied with high accuracy.

The method for supplying a liquid raw material according to the present invention comprises deaerating the liquid raw material and supplying the deaerated liquid raw material to the liquid flow control section from the liquid raw material container. The method can be practiced using, for example, a vaporizing and supplying apparatus shown in FIG. 3. Specifically, in this method, a liquid raw material 9 supplied from a liquid raw material container 8 by the pressure of a first inert gas is introduced into a deaerating section 11 and is allowed to pass in the inside of a gas permeable synthetic resin tube, and a second inert gas having a lower permeability into the synthetic resin tube than the first inert gas is also allowed to pass along the external surface of the synthetic resin tube whereby the first inert gas dissolved in the liquid raw material is allowed to penetrate into the outside of the synthetic resin tube and thereafter the liquid raw material is supplied to a liquid flow control section 14. In FIG. 3, No. 10 denotes the supply line for supplying the first inert gas, No. 12 denotes the supply line for supplying the second inert gas, No. 13 denotes the inert gas exhaust line, No. 15 denotes the check valve, No. 16 denotes the atomizer, No. 17 denotes the carrier gas-supplying line, No. 18 denotes the block heater, No. 19 denotes the evaporator, No. 20 denotes the valve and No. 21 denotes the semiconductor-manufacturing apparatus.

The aforementioned apparatus for supplying the liquid raw material is usually used to practice the method of the present invention for supplying the liquid raw material.

As the liquid raw material container to be filled with the liquid raw material in the present invention, a container used for the commercially available product of the liquid raw material may be used as it is although a container manufactured appropriately corresponding to the purpose may be used. When the liquid raw material is vaporized and supplied, the supply apparatus is designed so that the liquid raw material 9 is supplied to the deaerating section 11 by the pressure of the first inert gas as shown in FIG. 3. The liquid raw material 9 which is supplied to the deaerating section 11 from the liquid raw material container 8 and in which the first inert gas is dissolved is allowed to flow inside of the gas permeable synthetic resin tube and the second inert gas having lower permeability into the synthetic resin tube than the first inert gas is allowed to pass along the external surface of the synthetic resin tube in the deaerating section 11.

Such an operation makes it possible to allow the first inert gas dissolved in the liquid raw material to penetrate into the outside of the synthetic resin tube while restraining the second inert gas from penetrating into the inside of the synthetic resin tube.

The first inert gas is preferably hydrogen or helium which is highly permeable into the synthetic resin tube and the second inert gas is preferably nitrogen or argon which has low permeability into the synthetic resin tube and is easily available.

It is preferable that the directions of the liquid raw material flow in the synthetic resin tube and the second inert gas flow are opposite to each other to promote the permeation of the first inert gas, dissolved in the liquid raw material, into the outside of the synthetic resin tube. The flow rate of the liquid raw material is generally about 0.01 to 20 ml/min and preferably 0.1 to 10 ml/min. The flow rate of the second inert gas is generally about 10 to 5000 ml/min and preferably 500 to 2000 ml/min.

As aforementioned, the method and apparatus for supplying a liquid raw material according to the present invention ensure that in semiconductor-manufacturing processes, inert gas dissolved in the liquid raw material can be removed easily and efficiently before the flow rate of the liquid raw material is controlled in a liquid flow control section such as a bellows pump or a mass flow controller.

The present invention will be hereinafter explained in more detail by way of examples, which are not intended to be limiting of the present invention.

Example 1

(Manufacturing of a Liquid Raw Material Supply Apparatus)

Figure 3:
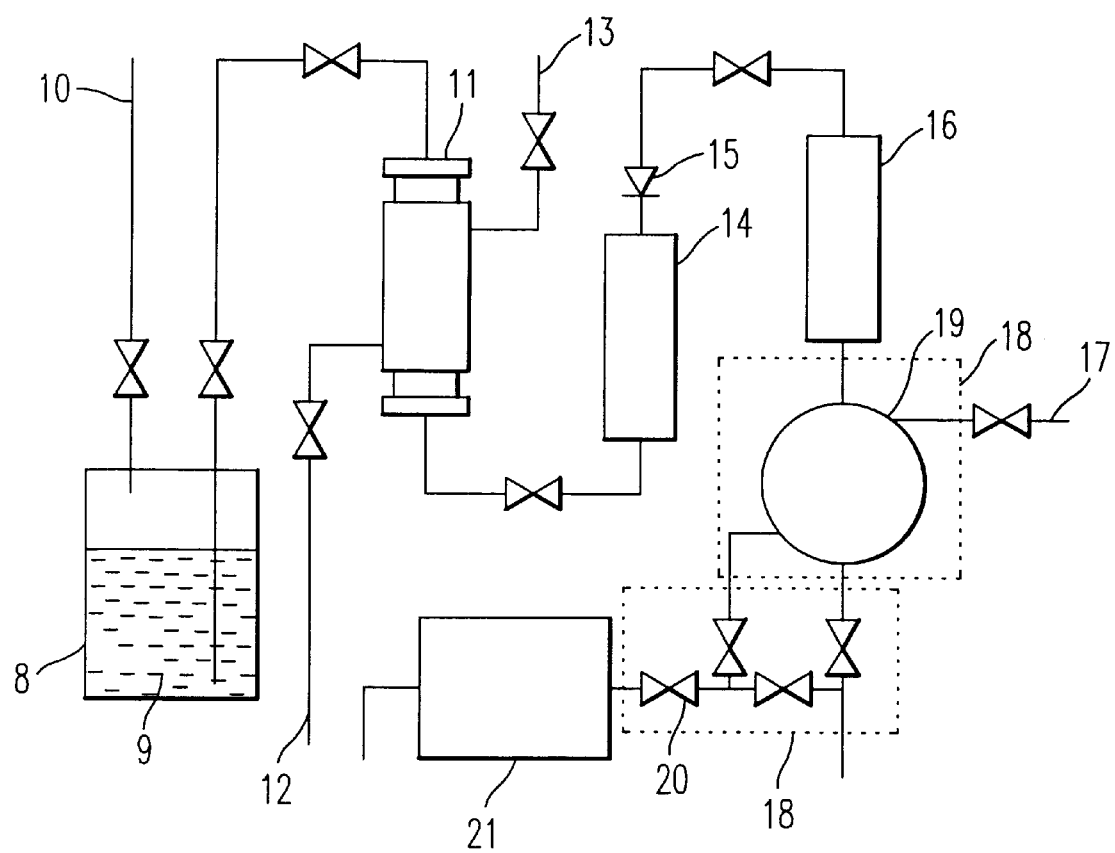
FIG. 3 is a structural view showing an example in which the supply apparatus of the present invention is applied to a vaporizing and supplying unit.

A liquid raw material supply apparatus comprising a deaerating section and a mass flow controller having a structure shown in FIG. 3 was manufactured.

The deaerating section was designed to have a structure in which, in a stainless container with a cylinder form having an inside diameter of 100 mm and a height of 200 mm, a stainless cylinder having an outside diameter of 60 mm and a height of 140 mm was disposed on the same axis as the container and a PTFE tube was wound coil-wise around the side surface of the cylinder and enclosed. The shape of the tube was as follows: inside diameter: 1.6 mm, outside diameter: 3.2 mm and length: 3.0 m.

(Test for Supplying the Liquid Raw Material)

A commercially available raw material container filled with 500 ml of tetraethoxysilane as the liquid raw material was connected to the inlet side of the deaerating section of the liquid raw material supply apparatus manufactured in the above manner. Also, a non-contact type flow meter was disposed to measure variations in the flow of the liquid raw material on the outlet side of the mass flow controller. Moreover, the inside of the above commercially available liquid raw material container was placed in a reduced pressure condition.

Figure 4:
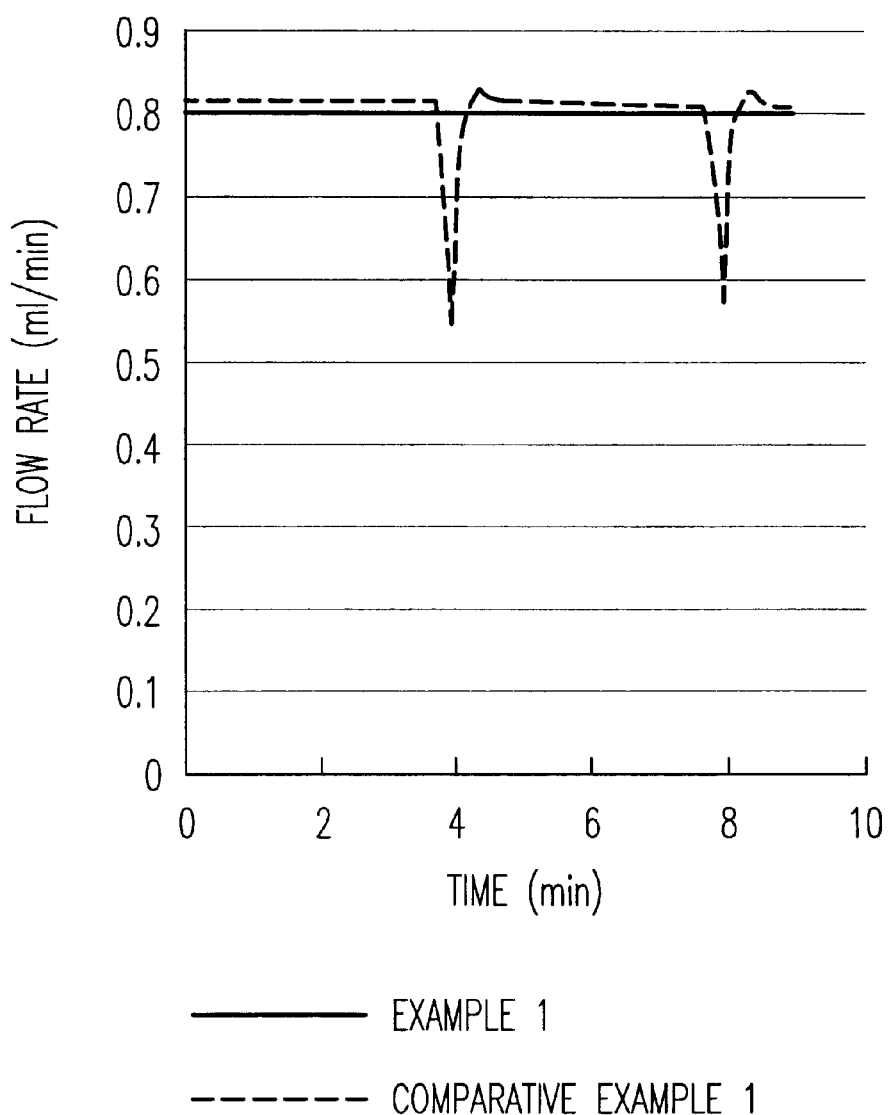
FIG. 4 is a graph showing the results of flow variations in a test for supplying a liquid raw material in Example 1 and Comparative Example 1.

Helium gas was introduced from a first inert gas line to fill the liquid raw material container with it and then the pressure of helium gas was raised to 0.1 MPaG. At the same time, the mass flow controller was started operating and tetraethoxysilane contained in the liquid raw material container was supplied at a rate of 0.8 ml/min to the mass flow controller through the deaerating section. On the other hand, nitrogen from the second inert gas line was allowed to pass along the outside of the PTFE tube in a direction opposite to the direction in which the liquid raw material flow at a pressure of 0.1 MPaG and a flow rate of 500 ml/min. The pressure applied to tetraethoxysilane at the outlet side of the mass flow controller was designed to be 0.01 MPaabs. The results of a variation in the flow rate of tetraethoxysilane which was measured by a non-contact type flow meter during that time are shown in FIG. 4.

Comparative Example 1

A test for supplying a liquid raw material was conducted in the same manner as in Example 1 except that the deaerating section was dismantled from the liquid raw material supply system used in Example 1 and the liquid raw material container was connected directly to the mass flow controller. The results of a variation in the flow rate of tetraethoxysilane which was measured by a non-contact type flow meter during that time are shown in FIG. 4.

In Comparative Example 1, a variation in the flow rate of tetraethoxysilane was measured at intervals of about 4 minutes. It was estimated from the variation in the flow rate as shown in FIG. 4 that fine air bubbles of helium gas dissolved in tetraethoxysilane were generated in tetraethoxysilane due to a reduction in pressure and gathered to form large air bubbles which flowed at a stretch. In Example 1, the flow rate of tetraethoxysilane was kept constant at 0.8 ml/min and no variation in the flow rate was measured. It was therefore estimated that helium gas was sufficiently removed in the deaerating section.

What is claimed is:

1. A method for supplying a liquid raw material wherein the liquid raw material is deaerated and supplied from a liquid raw material container to a liquid flow control section, the method comprising passing the liquid raw material, supplied from a liquid raw material container by the pressure of a first inert gas, inside of a gas permeable synthetic resin tube, passing a second inert gas having a lower permeability into the synthetic resin tube than the first inert gas along the external surface of the synthetic resin tube whereby the first inert gas dissolved in the liquid raw material is allowed to penetrate into the outside of the synthetic resin tube and then supplying the liquid raw material to the liquid flow control section.

2. A method for supplying a liquid raw material according to claim 1, wherein the directions of the liquid raw material flow in the synthetic resin tube and the direction of the second inert gas flow are opposite to each other.

3. A method for supplying a liquid raw material according to claim 1, wherein the liquid raw material contains an organic metal compound.

4. A method for supplying a liquid raw material according to claim 1, wherein the liquid raw material is deaerated and supplied by an apparatus having a deaerating section and a liquid flow control section for supplying a liquid raw material, the deaerating section comprising a gas permeable synthetic resin tube, an introduction port and a discharge port for introducing and discharging the liquid raw material respectively, the both being connected to each other by the synthetic resin tube, a passage for passing the inert gas along the external surface of the synthetic resin tube and an introduction port and a discharge port for introducing and discharging the inert gas respectively.

5. The method as claimed in claim 4, wherein the deaerating section has a structure in which said gas permeable synthetic resin tube is wound coil-wise and enclosed inside of a container having a cylindrical form.

6. The method as claimed in claim 4, wherein the deaerating section has a structure in which said gas permeable synthetic resin tube is wound coil-wise and enclosed inside of a container having a polygonal form.

7. The method as claimed in claim 4, wherein the deaerating section has a structure in which said gas permeable synthetic resin tube is wound coil-wise around a column body or a polygonal column body and enclosed on the inside of a container having a cylindrical form.

8. The method as claimed in claim 4, wherein the deaerating section has a structure in which said gas permeable synthetic resin tube is wound coil-wise around a column body or a polygonal column body and enclosed on the inside of a container having a polygonal form.

9. The method as claimed in claim 4, wherein the liquid flow control section comprises a mass flow controller.

10. The method as claimed in claim 1, wherein said second inert gas has a flow rate of from 500 to 2000 ml/min.

11. A method for supplying a liquid raw material wherein the liquid raw material is deaerated and supplied from a liquid raw material container to a liquid flow control section, the method comprising passing the liquid raw material, supplied from a liquid raw material container by the pressure of a first inert gas, wherein said first inert gas is a gas selected from the group consisting of hydrogen and helium, inside of a gas permeable fluorocarbon resin tube, passing a second inert gas, wherein said second inert gas is a gas selected from the group consisting of nitrogen and argon, having a lower permeability into the fluorocarbon resin tube than the first inert gas along the external surface of the fluorocarbon resin tube whereby the first inert gas dissolved in the liquid raw material is allowed to penetrate into the outside of the fluorocarbon resin tube and then supplying the liquid raw material to the liquid flow control section.

12. A method for supplying a liquid raw material according to claim 11, wherein the directions of the liquid raw material flow in the fluorocarbon resin tube and the direction of the second inert gas flow are opposite to each other.

13. A method for supplying a liquid raw material according to claim 11, wherein the liquid raw material contains an organic metal compound.

* * * * *